(12) United States Patent
Kerns et al.

(10) Patent No.: US 7,648,575 B2
(45) Date of Patent: *Jan. 19, 2010

(54) PROVIDING FREEZING AND THAWING RESISTANCE TO CEMENTITIOUS COMPOSITIONS

(75) Inventors: Michael L. Kerns, Medina, OH (US); Bruce J. Christensen, Solon, OH (US)

(73) Assignee: Construction Research & Technology GmbH, Trostberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/355,269

(22) Filed: Jan. 16, 2009

(65) Prior Publication Data

US 2009/0124728 A1    May 14, 2009

Related U.S. Application Data

(63) Continuation of application No. 11/452,046, filed on Jun. 13, 2006, now Pat. No. 7,531,584.

(60) Provisional application No. 60/690,237, filed on Jun. 14, 2005.

(51) Int. Cl.
*C04B 16/08* (2006.01)
*C04B 24/00* (2006.01)

(52) U.S. Cl. .......... 106/672; 106/677; 106/678; 524/2

(58) Field of Classification Search .......... 524/2; 106/672, 677, 678
See application file for complete search history.

(56) References Cited

U.S. PATENT DOCUMENTS

| | | | |
|---|---|---|---|
| 2,797,201 A | 6/1957 | Veatch et al. | |
| 3,272,765 A | 9/1966 | Sefton | |
| 3,361,688 A | 1/1968 | Bonitz et al. | |
| 3,591,394 A | 7/1971 | Diggelmann et al. | |
| 3,804,058 A | 4/1974 | Messenger | |
| 3,902,911 A | 9/1975 | Messenger | |
| 4,057,526 A | 11/1977 | de Rook | |
| 4,082,562 A | 4/1978 | Litvan et al. | |
| 4,142,909 A | 3/1979 | Gaines | |
| 4,204,988 A | 5/1980 | Crouzet | |
| 4,234,344 A | 11/1980 | Tinsley et al. | |
| 4,252,193 A | 2/1981 | Powers et al. | |
| 4,303,736 A | 12/1981 | Torobin | |
| 4,340,510 A | 7/1982 | Howanietz et al. | |
| 4,367,093 A | 1/1983 | Burkhalter et al. | |
| 4,427,836 A | 1/1984 | Kowalski et al. | |
| 4,450,010 A | 5/1984 | Burkhalter et al. | |
| 4,468,498 A | 8/1984 | Kowalski et al. | |
| 4,594,363 A | 6/1986 | Blankenship et al. | |
| 4,654,084 A | 3/1987 | Heinen | |
| 5,188,889 A | 2/1993 | Nagatomi et al. | |
| 5,571,318 A | 11/1996 | Griffith et al. | |
| 5,728,209 A | 3/1998 | Bury et al. | |
| 6,060,535 A | 5/2000 | Villar et al. | |
| 6,485,560 B1 | 11/2002 | Scherer et al. | |
| 6,508,305 B1 | 1/2003 | Brannon et al. | |
| 6,572,697 B2 | 6/2003 | Gleeson et al. | |
| 6,617,364 B2 | 9/2003 | Soane et al. | |
| 6,626,991 B1 | 9/2003 | Drochon et al. | |
| 6,722,434 B2 | 4/2004 | Reddy et al. | |
| 2002/0035951 A1 | 3/2002 | Chatterji et al. | |
| 2002/0117086 A1 | 8/2002 | Shi et al. | |
| 2003/0109592 A1 | 6/2003 | Shulman | |
| 2003/0110984 A1 | 6/2003 | Scherer et al. | |
| 2003/0116064 A1 | 6/2003 | Danican et al. | |
| 2003/0205172 A1 | 11/2003 | Gleeson et al. | |
| 2004/0137032 A1 | 7/2004 | Wang | |
| 2004/0147406 A1 | 7/2004 | Go Boncan | |
| 2004/0168801 A1 | 9/2004 | Reddy et al. | |
| 2004/0221990 A1 | 11/2004 | Heathman et al. | |
| 2005/0098317 A1 | 5/2005 | Reddy et al. | |
| 2005/0274285 A1 | 12/2005 | Christensen et al. | |
| 2005/0274294 A1 | 12/2005 | Brower et al. | |
| 2005/0284340 A1 | 12/2005 | Vickers et al. | |
| 2006/0281835 A1 | 12/2006 | Ong | |

FOREIGN PATENT DOCUMENTS

| | | |
|---|---|---|
| AU | 404612 | 5/1967 |
| DE | 19 61 390 A1 | 6/1971 |
| DE | 2 229 094 | 1/1973 |
| DE | 30 26 719 A1 | 5/1981 |
| EP | 0 022 633 B1 | 1/1981 |
| EP | 0 73 529 B1 | 3/1981 |
| EP | 0 188 325 | 7/1992 |
| JP | 07-277794 | 4/1994 |
| JP | 07-206505 A | 8/1995 |
| WO | WO 2004-007399 A | 1/2004 |

OTHER PUBLICATIONS

Betonwerk + Fertigteil-Technik —"A New Method of Making Concrete Resistant to Frost and De-icing Salts" by Dr. Sommer; Sep. 1978.
Patent Abstracts of Japan, vol. 1999, No. 11, Sep. 30, 1999 & JP 11 147777 A (Kanegafuchi Chem Ind Do. Ltd., Jun. 2, 1999.
Patent Abstracts of Japan, vol. 1999, No. 14, Dec. 22, 1999 & JP 11 246253 A (Taisei Corp) Sep. 14, 1999.
Patent Abstracts of Japan, vol. 1996, No. 07, Jul. 31, 1996 & JP 08 059327 A (Hokkaido Kaihatsukyoku Doboku Kenkyusho Shin Etsu Chem Co. Ltd.

(Continued)

*Primary Examiner*—Elizabeth D Wood
(74) *Attorney, Agent, or Firm*—Curatolo Sidoti Co., LPA; Joseph G. Curatolo; Salvatore A. Sidoti

(57) ABSTRACT

An improved freeze-thaw durability cementitious composition is provided that uses at least partially degradable polymeric particles that are blended directly into the cementitious composition mixture. The degradable polymeric particles provide void spaces in the cementitious material matrix, and such void spaces act to increase freeze-thaw durability of the cementitious material.

22 Claims, No Drawings

OTHER PUBLICATIONS

Internet Brochure, Apr. 25, 2005, "EXPANCEL microspheres expand—and so does your profitability" (www.expancel.com/All_languages/about/files/EXPGEN002EN_Expancel%C2%AEMagic.pdf).

Patent Abstracts of Japan, vol. 2003, No.02, Feb. 5, 2003 & JP 2002 294656 A (Life Stage Kigyo Kumiai, Oct. 9, 2002).

Patent Abstracts of Japan, vol. 1996, No. 09, Sep. 30, 1996 & JP 08 133799 A (Asahi Chem Ind Co Ltd; Toyo Sogo Kenkyusho:KK, May 28, 1996).

Patent Abstracts of Japan, vol. 2000, No. 03, Mar. 30, 2000 & JP 11 343182 A (Nichiha Corp, Dec. 14, 1999).

Patent Abstracts of Japan, vol. 014, No. 363 (C-0746), Aug. 7, 1990 & JP 02 133357 A (Sumitomo Metal Ind Ltd, May 22, 1990).

PROVIDING FREEZING AND THAWING RESISTANCE TO CEMENTITIOUS COMPOSITIONS

CROSS-REFERENCE TO RELATED APPLICATIONS

This application is a continuation of U.S. Ser. No. 11/452,046, filed on Jun. 13, 2006 now U.S. Pat. No. 7,531,584, which claims the benefit of the filing date of U.S. Provisional Application for Patent Ser. No. 60/690,237, filed on Jun. 14, 2005, both of which are incorporated herein by reference.

BACKGROUND

It is well known that freezing and thawing cycles can be extremely damaging to water-saturated hardened cement compositions such as concrete. The best known technique to prevent or reduce the damage done is the incorporation into the composition of microscopically fine pores or voids. The pores or voids function as internal expansion chambers and can therefore protect the concrete from frost damage by relieving the hydraulic pressure caused by an advancing freezing front in the concrete. The method used in the prior art for artificially producing such voids in concrete has been by means of air-entraining agents, which stabilize tiny bubbles of air that are entrapped in the concrete during mixing.

These air voids are typically stabilized by use of surfactants during the mixing process of concrete. Unfortunately, this approach of entraining air voids in concrete is plagued by a number of production and placement issues, some of which are the following:

Air Content: Changes in air content of the cementitious mixture can result in concrete with poor resistance to freezing and thawing distress if the air content drops with time or reduce the compressive strength of concrete if the air content increases with time. Examples are pumping concrete (decrease air content by compression), job-site addition of a superplasticizer (often elevates air content or destabilizes the air void system), interaction of specific admixtures with the air-entraining surfactant (could increase or decrease air content).

Air Void Stabilization: The inability to stabilize air bubbles can be due to the presence of materials that adsorb the stabilizing surfactant, i.e., fly ash with high surface area carbon or insufficient water for the surfactant to work properly, i.e. low slump concrete.

Air Void Characteristics: Formation of bubbles that are too large to provide resistance to freezing and thawing, can be the result of poor quality or poorly graded aggregates, use of other admixtures that destabilize the bubbles, etc. Such voids are often unstable and tend to float to the surface of the fresh concrete.

Overfinishing: Removal of air by overfinishing, removes air from the surface of the concrete, typically resulting in distress by scaling of the detrained zone of cement paste adjacent to the overfinished surface.

The generation and stabilization of air at the time of mixing and ensuring it remains at the appropriate amount and air void size until the concrete hardens are the largest day-to-day challenges for the ready mix concrete producer in North America.

Adequately air-entrained concrete remains one of the most difficult types of concrete to make. The air content and the characteristics of the air void system entrained into the concrete cannot be controlled by direct quantitative means, but only indirectly through the amount/type of air-entraining agent added to the mixture. Factors such as the composition and particle shape of the aggregates, the type and quantity of cement in the mix, the consistency of the concrete, the type of mixer used, the mixing time, and the temperature all influence the performance of the air-entraining agent. The void size distribution in ordinary air-entrained concrete can show a very wide range of variation, between 10 and 3,000 micrometers (μm) or more. In such concrete, besides the small voids which are essential to cyclic freeze-thaw resistance, the presence of larger voids—which contribute little to the durability of the concrete and could reduce the strength of the concrete—has to be accepted as an unavoidable feature The characteristics of an air void system in hardened concrete are determined by means of ASTM C457 Standard Test method for Microscopical Determination of Parameters of the Air-Void System in Hardened concrete. These characteristics are expressed as a series of parameters that are indicative of the average voids size (specific surface area), volumetric abundance (air content) and average distance between the voids (spacing factor). These values have been used in the concrete industry to determine the expected performance and durability of concrete in a water-saturated cyclic freezing environment. ACI guidelines recommend that the specific area be greater than 600 $in^{-1}$ and the spacing factor equal to or less than 0.008 in to ensure resistance to freezing and thawing cycles.

Those skilled in the art have learned to control for these influences by the application of appropriate rules for making air-entrained concrete. They do, however, require the exercise of particular care in making such concrete and continually, checking the air content, because if the air content is too low, the frost resistance of the concrete will be inadequate, while on the other hand, if the air content is too high it will adversely affect the compressive strength.

The methods for controlling air voids in the prior art often result in inconsistent performance. If air bubbles of acceptable size and spacing are not entrained by the action of mixing, then no amount of bubble stabilizing chemical systems can produce an acceptable air void structure in the hardened concrete.

Therefore, it is desirable to provide an admixture which produces a freeze-thaw durable void structure directly in a cementitious mixture, without requiring the shear conditions for generation of properly sized air bubbles during mixing. The void structures may comprise optimally sized voids to the mixture that provide the cementitious composition with improved freeze-thaw durability. The admixture should also reduce or eliminate the reduction of compressive strength for products manufactured from mixtures containing conventional air-entraining chemical admixtures.

SUMMARY

A cementitious freeze-thaw damage resistant composition is provided which comprises hydraulic cement, and at least partially degradable polymeric particles.

A method for preparing a freeze-thaw damage resistant cementitious composition is provided which comprises forming a mixture of water, hydraulic cement, and at least partially degradable polymeric particles.

DETAILED DESCRIPTION

An improved freeze-thaw durability cementitious composition is provided. The cementitious composition's freeze-thaw resistance is provided by the incorporation of predictable "air" contents by use of small degradable polymeric particles having selected dimensions and optionally an added chemical or blend of chemicals that generate gas when dispersed into the cementitious mixture. While not intending to be limited by theory, the polymeric particles are unstable in highly alkaline environments (as would be found in cementitious compositions) and degrade via base catalyzed hydrolysis over a period of hours, days, or weeks to leave a void. The degradable polymeric particles are also susceptible to degradation by enzymes and bacteria, as well as by catalysis from transition metals that are present in the cementitious composition. The void spaces are therefore created during the hydration process, during set, and further after the cementitious composition has hardened.

Traditional air entrainment techniques are variable in their efficacy and polycarboxylates are known in the art for higher-than-desirable air contents. The disclosed degradable particles allow for heavy use of defoaming agents to eliminate any adventitious air that might be brought about through variability in other raw materials in the mix design.

The use of degradable polymeric particles eliminates most of the problems in the current art. Degradable polymeric particles include fully degradable particles and at least partially degradable particles. By partially degradable, it is meant that a portion of the particle structure may not be susceptible to hydrolytic degradation, thus leaving a partially filled cavity. It also makes possible the use of materials, i.e., low grade, high-carbon fly ash which are currently landfilled as they are not usable in air-entrained cementitious compositions without further treatment. This results in cement savings, and therefore economic savings. In one embodiment the voids "created" by this approach are about 6 volume percent or less.

The cementitious composition and method of producing it use degradable polymeric particles to provide void spaces in the cementitious material matrix prior to final setting, and such void spaces act to increase the freeze-thaw durability of the cementitious material. Degradable polymeric particles introduce voids into the cementitious composition to produce a fully formed void structure in the concrete that resists degradation produced by freeze-thaw cycles and does not rely on air bubble stabilization during mixing of the cementitious composition. The freeze-thaw durability enhancement produced by degraded polymeric particles is based on a physical mechanism for relieving stresses produced when water freezes in a cementitious material. In conventional practice, properly sized and spaced voids are generated in the hardened material by using chemical admixtures to stabilize the air voids entrained to a concrete mixture during mixing. In the present conventional cementitious compositions these chemical admixtures as a class are called air-entraining agents. In the present cementitious composition and method, addition of degradable polymeric particles in the cementitious mixture at some time prior to final set produces voids in the hardened material. Additionally, voids may continue to be produced in the post set cementitious composition through the degradation of the polymeric particles.

The cementitious compositions provided generally comprise hydraulic cement, degradable polymeric particles. Water is added to form the cementitious composition into a paste. The cementitious composition includes mortars, grouts, shotcrete, concretes or any other composition which comprises cement. The applications for the disclosed cementitious compositions include flatwork, paving (which is typically difficult to air entrain by conventional means), vertical applications, precast poured cement compositions and articles formed from cementitious compositions.

The cementitious composition in which the present admixture is used will generally be exposed to the environment; that is, the cementitious composition will be in an environment exposed to weathering, and freeze-thaw cycling.

The hydraulic cement can be a portland cement, a calcium aluminate cement, a magnesium phosphate cement, a magnesium potassium phosphate cement, a calcium sulfoaluminate cement or any other suitable hydraulic binder. Aggregate may be included in the cementitious composition. The aggregate can be silica, quartz, sand, crushed marble, glass spheres, granite, limestone, calcite, feldspar, alluvial sands, any other durable aggregate, and mixtures thereof.

The degradable polymeric particles are of an average diameter of about 100 micrometers or less, and in certain embodiments may have an average diameter of about 25 micrometers or less, and in other embodiments may have an average diameter of about 10 micrometers or less. The degradable polymeric particles by way of example but not limitation include expanded and unexpanded microspheres, solid or porous microspheres, particles, fibers or cylinders. The degradable polymeric particles may have a hollow core within an outside wall. Expanded degradable polymeric particles (formed by expansion of a self contained liquid to gas phase) or unexpanded degradable polymeric particles (contain unexpanded liquid state) may be used. The interior portion of the degradable polymeric particles may comprise a void cavity or cavities that may contain gas (gas filled) as in expanded degradable polymeric particles or liquid (liquid filled) such as in unexpanded degradable polymeric particles.

Furthermore, the degradable polymeric particles may comprise a degradable shell surrounding a sold particle such as a salt. Such salts may act as accelerating admixtures upon dissolution into the pore solution after degradation of the degradable shell. Solid particles of the proper size and distribution may also be formed by grinding of larger particles or pellets. In some cases, cryogenic grinding may be required to obtain the proper particle size and distribution. Alternatively, solid particles may be formed via an emulsification process wherein a solution of the polymer is emulsified and stripped of solvent. Other emulsion techniques including polymerization may also be used to form such particles.

The polymeric particles may be comprised of a polyester or polylactone polymer. In some embodiments the polyester may comprise polylactic acid, polyglycolic acid, or copolymers or mixtures thereof, for example but not for limitation such as copolymers of polylactic acid-polyglycolic acid, lactide-caprolactone, lactide-ethylene oxide, lactide-cyclic carbonate, lactide derived poly(ester amides), and poly(L-lactide-co-D-lactide). Additionally, in certain embodiments in which the particles comprise polylactic acid, copolymers of polylactic acid, or mixtures of polylactic acid, as the particles are degraded in the cementitious composition, lactic acid is produced which is a known strength enhancer.

Certain properties may be provided to the degradable polymeric particles from the use of specific combinations of copolymers. For example, by varying the co-monomer ratios of lactic and glycolic acid, the hydrolysis rate of the resulting polymer may be controlled, thereby improving the rate at which air voids are generated in the hardened cementitious composition. Additional control can be achieved by control of the molecular weight of the polymer so as to optimize the balance between physical properties (such as durability during mixing and grinding) and rate of air void generation through a hydrolytic degradation mechanism. Blends of polymers may also be used to optimize the production and degradation processes. Further, physical properties, such as the modulus of the material, may be controlled. For example, increasing the crystallinity of the polymer produces a finer powder due to the ease of grinding, thereby providing a finer air void structure. Also, the degree or amount of cross-linking of the polymer can affect the rate and degree of polymeric degradation.

In certain embodiments the dimensions of the particles may be those that are smaller than about 10 μm in average diameter. The smaller the diameter of the degradable polymeric particles, the lower the volume of material that is required to achieve the desired spacing factor (which is a predictor of resistance to freezing and thawing). This is beneficial from a performance perspective, in that less of a decrease in compressive strength occurs by their addition, as well as an economic perspective, since a lower mass of particles or spheres is required. Similarly, the wall thickness of hollow degradable polymeric particles should be as thin as possible, to minimize material cost, but thick enough to resist damage/fracture during the cementitious composition mixing, placing, consolidating and finishing processes.

The amount of degradable polymeric particles to be added to the cementitious composition is about 0.05 percent to 6 percent of total volume or about 0.01 percent by weight of dry cement to about 4 percent by weight of dry cement.

The degradable polymeric particles may be added to cementitious compositions in a number of forms. The first is as a dry powder, in which dry powder handling equipment for use with very low bulk density material can be used. The degradable polymeric particles may be available as a damp powder or slurry, which is 85% water by weight. In certain embodiments use of a liquid admixture such as a viscosity modifying admixture, paste or slurry substantially reduces the loss of material during the charging of the mixer. A third form is as a compact mass, such as a block or puck, similar to the DELVO® ESC admixture sold by Degussa Admixtures, Inc. Cleveland, Ohio. The degradable polymeric particles are preformed into discreet units with an adhesive that breaks down in water.

The cementitious composition described herein may contain other additives or ingredients and should not be limited to the stated formulations. Cement additives that can be added independently include, but are not limited to: air entrainers, aggregates, pozzolans, dispersants, set and strength accelerators/enhancers, set retarders, water reducers, corrosion inhibitors, wetting agents, water soluble polymers, rheology modifying agents, water repellents, fibers, dampproofing admixtures, permeability reducers, pumping aids, fungicidal admixtures, germicidal admixtures, insecticide admixtures, finely divided mineral admixtures, alkali-reactivity reducer, bonding admixtures, shrinkage reducing admixtures, and any other admixture or additive that does not adversely affect the properties of the cementitious composition. The cementitious compositions need not contain one of each of the foregoing additives.

Aggregate can be included in the cementitious formulation to provide for mortars which include fine aggregate, and concretes which also include coarse aggregate. The fine aggregate are materials that almost entirely pass through a Number 4 sieve (ASTM C 125 and ASTM C 33), such as silica sand. The coarse aggregate are materials that are predominantly retained on a Number 4 sieve (ASTM C 125 and ASTM C 33), such as silica, quartz, crushed marble, glass spheres, granite, limestone, calcite, feldspar, alluvial sands, sands or any other durable aggregate, and mixtures thereof.

A pozzolan is a siliceous or aluminosiliceous material that possesses little or no cementitious value but will, in the presence of water and in finely divided form, chemically react with the calcium hydroxide produced during the hydration of portland cement to form materials with cementitious properties. Diatomaceous earth, opaline cherts, clays, shales, fly ash, slag, silica fume, volcanic tuffs and pumicites are some of the known pozzolans. Certain ground granulated blast-furnace slags and high calcium fly ashes possess both pozzolanic and cementitious properties. Natural pozzolan is a term of art used to define the pozzolans that occur in nature, such as volcanic tuffs, pumices, trasses, diatomaceous earths, opaline, cherts, and some shales. Nominally inert materials can also include finely divided raw quartz, dolomites, limestones, marble, granite, and others. Fly ash is defined in ASTM C618.

If used, silica fume can be uncompacted or can be partially compacted or added as a slurry. Silica fume additionally reacts with the hydration byproducts of the cement binder, which provides for increased strength of the finished articles and decreases the permeability of the finished articles. The silica fume, or other pozzolans such as fly ash or calcined clay such as metakaolin, can be added to the cementitious mixture in an amount from about 5% to about 70% based on the weight of cementitious material.

A dispersant if used in the cementitious composition can be any suitable dispersant such as lignosulfonates, beta naphthalene sulfonates, sulfonated melamine formaldehyde condensates, polyaspartates, polycarboxylates with and without polyether units, naphthalene sulfonate formaldehyde condensate resins for example LOMAR D® dispersant (Cognis Inc., Cincinnati, Ohio), or oligomeric dispersants.

Polycarboxylate dispersants can be used, by which is meant a dispersant having a carbon backbone with pendant side chains, wherein at least a portion of the side chains are attached to the backbone through a carboxyl group or an ether group. The term dispersant is also meant to include those chemicals that also function as a plasticizer, high range water reducer, fluidizer, antiflocculating agent, or superplasticizer for cementitious compositions. Examples of polycarboxylate dispersants can be found in U.S. Pub. No. 2002/0019459 A1, U.S. Pat. Nos. 6,267,814, 6,290,770, 6,310,143, 6,187,841, 5,158,996, 6,008,275, 6,136,950, 6,284,867, 5,609,681, 5,494,516; 5,674,929, 5,660,626, 5,668,195, 5,661,206, 5,358,566, 5,162,402, 5,798,425, 5,612,396, 6,063,184, and 5,912,284, 5,840,114, 5,753,744, 5,728,207, 5,725,657, 5,703,174, 5,665,158, 5,643,978, 5,633,298, 5,583,183, and 5,393,343, which are all incorporated herein by reference, as if fully written out below.

The term oligomeric dispersant refers to oligomers that are a reaction product of: component A, optionally component B, and component C; wherein each component A is independently a nondegradable, functional moiety that adsorbs onto a cementitious particle; wherein component B is an optional moiety, where if present, each component B is independently a nondegradable moiety that is disposed between the component A moiety and the component C moiety; and wherein component C is at least one moiety that is a linear or branched water soluble, nonionic polymer substantially non-adsorbing to cement particles. Oligomeric dispersants are disclosed in U.S. Pat. Nos. 6,133,347, 6,492,461, and 6,451,881, which are hereby incorporated by reference, as if fully written out below.

Set and strength accelerators/enhancers that can be used include, but are not limited to, a nitrate salt of an alkali metal, alkaline earth metal, or aluminum; a nitrite salt of an alkali metal, alkaline earth metal, or aluminum; a thiocyanate of an alkali metal, alkaline earth metal or aluminum; an alkanolamine; a thiosulphate of an alkali metal, alkaline earth metal, or aluminum; a hydroxide of an alkali metal, alkaline earth metal, or aluminum; a carboxylic acid salt of an alkali metal, alkaline earth metal, or aluminum (preferably calcium formate); a polyhydroxylalkylamine; a halide salt of an alkali metal or alkaline earth metal (preferably bromide), Examples of accelerators that can be used include, but are not limited to, POZZOLITH® NC534, non chloride type accelerator and/or RHEOCRETE® CNI calcium nitrite-based corrosion inhibitor both sold under the trademarks by Degussa Admixtures, Inc. of Cleveland, Ohio.

The salts of nitric acid have the general formula $M(NO_3)_a$ where M is an alkali metal, or an alkaline earth metal or aluminum, and where a is 1 for alkali metal salts, 2 for alkaline earth salts, and 3 for aluminum salts. Preferred are nitric acid salts of Na, K, Mg, Ca and Al.

Nitrite salts have the general formula $M(NO_2)_a$ where M is an alkali metal, or an alkaline earth metal or aluminum, and where a is 1 for alkali metal salts, 2 for alkaline earth salts, and 3 for aluminum salts. Preferred are nitric acid salts of Na, K, Mg, Ca and Al.

The salts of the thiocyanic acid have the general formula $M(SCN)_b$, where M is an alkali metal, or an alkaline earth metal or aluminum, and where b is 1 for alkali metal salts, 2 for alkaline earth salts and 3 for aluminum salts. These salts are variously known as sulfocyanates, sulfocyanides, rhodanates or rhodanide salts. Preferred are thiocyanic acid salts of Na, K, Mg, Ca and Al.

Alkanolamine is a generic term for a group of compounds in which trivalent nitrogen is attached directly to a carbon atom of an alkyl alcohol. A representative formula is $N[H]_c$ $[(CH_2)_d CHRCH_2R]_e$, where R is independently H or OH, c is 3–e, d is 0 to about 4 and e is 1 to about 3. Examples include, but are not limited to, are monoethanoalamine diethanolamine, triethanolamine and triisopropanolamine.

The thiosulfate salts have the general formula $M_f(S_2O_3)_g$ where M is alkali metal or an alkaline earth metal or aluminum, and f is 1 or 2 and g is 1, 2 or 3, depending on the valencies of the M metal elements. Preferred are thiosulfate acid salts of Na, K, Mg, Ca and Al.

The carboxylic acid salts have the general formula RCOOM wherein R is H or $C_1$ to about $C_{10}$ alkyl, and M is alkali metal or an alkaline earth metal or aluminum. Preferred are carboxylic acid salts of Na, K, Mg, Ca and Al. An example of carboxylic acid salt is calcium formate.

A polyhydroxylalkylamine can have the general formula

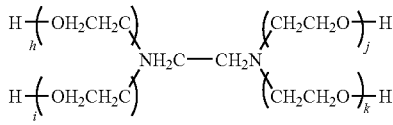

wherein h is 1 to 3, i is 1 to 3, j is 1 to 3, and k is 0 to 3. A preferred polyhydroxyalkylamine is tetrahydroxyethylethylenediamine.

Set retarding, or also known as delayed-setting or hydration control, admixtures are used to retard, delay, or slow the rate of setting of cementitious compositions. They can be added to the cementitious composition upon initial batching or sometime after the hydration process has begun. Set retarders are used to offset the accelerating effect of hot weather on the setting of cementitious compositions, or delay the initial set of cementitious compositions when difficult conditions of placement occur, or problems of delivery to the job site, or to allow time for special finishing processes. Most set retarders also act as low level water reducers and can also be used to entrain some air into cementitious compositions. Lignosulfonates, hydroxylated carboxylic acids, borax, gluconic, tartaric and other organic acids and their corresponding salts, phosphonates, certain carbohydrates such as sugars, polysaccharides and sugar-acids and mixtures thereof can be used as retarding admixtures.

Corrosion inhibitors in cementitious compositions serve to protect embedded reinforcing steel from corrosion. The high alkaline nature of cementitious compositions causes a passive and non-corroding protective oxide film to form on the steel. However, carbonation or the presence of chloride ions from deicers or seawater, together with oxygen can destroy or penetrate the film and result in corrosion. Corrosion-inhibiting admixtures chemically slow this corrosion reaction. The materials most commonly used to inhibit corrosion are calcium nitrite, sodium nitrite, sodium benzoate, certain phosphates or fluorosilicates, fluoroaluminates, amines, organic based water repelling agents, and related chemicals.

In the construction field, many methods of protecting cementitious compositions from tensile stresses and subsequent cracking have been developed through the years. One modern method involves distributing fibers throughout a fresh cementitious mixture. Upon hardening, this cementitious composition is referred to as fiber-reinforced cement. Fibers can be made of zirconium materials, carbon, steel, fiberglass, or synthetic materials, e.g., polypropylene, nylon, polyethylene, rayon, high-strength aramid, or mixtures thereof.

Dampproofing admixtures reduce the permeability of concrete that has low cement contents, high water-cement ratios, or a deficiency of fines in the aggregate portion. These admixtures retard moisture penetration into wet concrete and include certain soaps, stearates, and petroleum products.

Permeability reducers are used to reduce the rate at which water under pressure is transmitted through cementitious compositions. Silica fume, fly ash, ground slag, metakaolin, natural pozzolans, water reducers, and latex can be employed to decrease the permeability of the cementitious compositions.

Pumping aids are added to cement mixes to improve pumpability. These admixtures thicken the fluid cementitious compositions, i.e., increase its viscosity, to reduce de-watering of the paste while it is under pressure from the pump. Among the materials used as pumping aids in cementitious compositions are organic and synthetic polymers, hydroxyethylcellulose (HEC) or HEC blended with dispersants, polysaccharides, organic flocculents, organic emulsions of paraffin, coal tar, asphalt, acrylics, bentonite and pyrogenic silicas, nano-silicas, natural pozzolans, fly ash and hydrated lime.

Bacteria and fungal growth on or in hardened cementitious compositions may be partially controlled through the use of fungicidal, germicidal, and insecticidal admixtures. The most effective materials for these purposes are polyhalogenated phenols, dialdrin emulsions, and copper compounds.

Coloring admixtures are usually composed of pigments, either organic such as phthalocyanine or inorganic pigments such as metal-containing pigments that comprise, but are not limited to metal oxides and others, and can include, but are not limited to, iron oxide containing pigments such as CHROMIX®L (Degussa Admixtures, Inc. Cleveland Ohio), chromium oxide, aluminum oxide, lead chromate, titanium oxide, zinc white, zinc oxide, zinc sulfide, lead white, iron manganese black, cobalt green, manganese blue, manganese violet, cadmium sulfoselenide, chromium orange, nickel titanium yellow, chromium titanium yellow, cadmium sulfide, zinc yellow, ultramarine blue and cobalt blue.

Alkali-reactivity reducers can reduce the alkali-aggregate reaction and limit the disruptive expansion forces that this reaction can produce in hardened cementitious compositions. Pozzolans (fly ash, silica fume), blast-furnace slag, salts of lithium and barium are especially effective.

The shrinkage reducing agent which can be used comprises but is not limited to $RO(AO)_{1-10}H$, wherein R is a $C_{1-5}$ alkyl or $C_{5-6}$ cycloalkyl radical and A is a $C_{2-3}$ alkylene radical, alkali metal sulfate, alkaline earth metal sulfates, alkaline earth oxides, preferably sodium sulfate and calcium oxide. TETRAGUARD® admixture is an example of a shrinkage reducing agent (available from Degussa Admixtures, Inc. of Cleveland, Ohio) that can be used.

In one embodiment the cementitious freeze-thaw damage resistant composition comprises hydraulic cement, water, and at least partically degradable polymeric particles. In certain embodiments the degradable polymeric particles may be gas-filled (expanded), or liquid-filled (unexpanded) microspheres, solid or porous microspheres, particles, fibers or cylinders. In certain embodiments the degradable polymeric particles are present in a range from about 0.01 percent to about 4 percent by weight of dry cement; the degradable polymeric particles may have an average diameter of about 100 μm or less; the degradable polymeric particles may have an average diameter of about 25 μm or less; and/or the degradable polymeric particles may have an average diameter of about 10 μm or less. The degradable polymeric particles may comprise a polyester polymer or polylactone polymer. In certain embodiments the polyester may comprise polylactic acid, polyglycolic acid, or copolymers or mixtures thereof, for example but not for limitation such as polylactic acid-polyglycolic acid, lactide-caprolactone, lactide-ethylene oxide, lactide-cyclic carbonate, lactide derived poly(ester amides), and poly(L-lactide-co-D-lactide).

In another embodiment the cementitious compositions described above further comprise independently at least one of the following: dispersants, air entrainers, set and strength accelerators/enhancers, set retarders, water reducers, aggregate, corrosion inhibitors, wetting agents, water soluble polymers, rheology modifying agents, water repellents, fibers, dampproofing admixtures, permeability reducers, pumping aids, fungicidal admixtures, germicidal admixtures, insecticide admixtures, finely divided mineral admixtures, coloring admixtures, alkali-reactivity reducer, bonding admixtures, shrinkage reducing admixtures, or mixtures thereof.

In another embodiment a method for preparing a freeze-thaw damage resistant cementitious composition is provided that comprises providing a mixture of hydraulic cement, water, and degradable polymeric particles. In certain embodiments the degradable polymeric particles are added as a compact mass, powder, or liquid admixture such as a viscosity modifying admixture, paste or slurry.

EXAMPLES

Example 1

Rate of Dissolution: 4 mm PLA Beads at pH 10

Solid polylactic acid (PLA) beads of approximately 4 mm diameter were placed into an alkaline solution of NaOH (pH 10) to track the rate of degradation. The beads did not degrade, due to the fact that the pH of the solution was not high enough, and did not reflect actual cementitious composition pore solution conditions. In addition, since the rate of degradation is a function of surface area, these larger beads would be expected to degrade relatively slowly compared to particles of the proper size.

Example 2

Rate of Dissolution: 4 mm PLA Beads at pH 13

The solid polylactic acid beads were placed in glass jars with a 25% NaOH solution with a pH of 13 which better approximates cementitious composition pore solution conditions. In 20 days the beads were completely dissolved as a result of hydrolysis of the PLA polymer and formation of sodium lactide and lactide oligomers. The PLA pellets degraded on a time scale that would be of interest in concrete applications.

Example 3

Rate of Dissolution: PLA Fiber Samples

Solid polylactic acid (PLA) fibers of various lengths and having a width of 40 microns were placed in a 1.3 M NaOH solution and monitored visually to determine relative degree of degradation. Both samples completely dissolved within two days. Elevated temperatures (50° F., 70° F., 90° F.) did not have an apparent effect on the rate of dissolution as determined by this method.

Example 4

Two samples of PLA fibers were immersed in a 1 M NaOH solution and monitored visually for degradation. Both samples degraded at the same rate of just over a month's time. As determined microscopically based on the diameter of the fiber, after one week the fiber diameter had decreased by about 40%. The PLA fibers appear to erode radially as opposed to swelling and dissolving in mass.

Examples 5-9

Concrete Mixing

These examples demonstrate solid polylactic acid (PLA) particles degrading in concrete and the effect of the slow release of lactide into a hydrating cementitious system. Although the optimal particle size for an appropriate spacing factor was not used, these mixes model a functional system. The concrete mixes were defoamed to ensure that any additional void space present in the petrographic samples would be a result of the degradation of the PLA particles. These particles were produced in a grinding process and therefore were irregular and angular in shape and not spherical. 300 micron particle size solid polylactic acid (PLA) material was tested at different loading levels in concrete and compared to control samples where a conventional air-entraining additive was substituted, and where no air entrainer was included. Results are shown in Table 1 below.

TABLE 1

Concrete Testing Results

| Mix No. | Plain Reference Example 5 | 424.5 g PLA (1% vol) Example 6 | 212.3 g PLA (.5% vol) Example 7 | 849.1 g PLA (2% vol) Example 8 | 0.75 oz/cwt MA Example 9 |
|---|---|---|---|---|---|
| Cement (lbs/yd$^3$) | 604 | 604 | 605 | 603 | 603 |
| Water (lbs/yd$^3$) | 290 | 290 | 290 | 289 | 289 |
| Sand (lbs/yd$^3$) | 1220 | 1219 | 1221 | 1216 | 1148 |
| Stone (lbs/yd$^3$) | 1836 | 1834 | 1838 | 1830 | 1726 |
| Water:Cement Ratio | 0.48 | 0.48 | 0.48 | 0.48 | 0.48 |
| Sand:Aggregate Ratio | 0.40 | 0.40 | 0.40 | 0.40 | 0.40 |
| Admixture Dosages | | | | | |
| PLA (grams) | — | 424.50 | 212.28 | 849.14 | — |
| TBP Defoamer (% cmt) | 0.02 | 0.02 | 0.02 | 0.02 | — |
| Micro Air (MA) (oz/cwt) | — | — | — | — | 0.75 |
| Concrete Slump (in) | 7.75 | 6.00 | 6.75 | 4.00 | 7.75 |
| Concrete Air Content (%) | 1.8 | 1.9 | 1.7 | 2.1 | 6.0 |
| Set Times (hrs) | 5.7 | 6.0 | 6.0 | 7.9 | 6.9 |
| Compressive Strength | | | | | |
| 1 Day | 1930 | 1770 | 2020 | 750 | 1110 |
| 7 Days | 4970 | 5150 | 5700 | 2000 | 3600 |
| 28 Days | 6390 | 6350 | 7040 | 2810 | 4650 |
| Petrographic Results | | | | | |
| Concrete Air (%) | 2.2 | 4.2 | 4.0 | 3.8 | 6.0 |
| Specific Surface (in$^{-1}$) | 132 | 222 | 189 | 179 | 801 |
| Spacing factor (in) | 0.050 | 0.021 | 0.027 | 0.028 | 0.004 |

Retardation became apparent once a certain volume of PLA was introduced to the cementitious system. At this particle size (300 microns), retardation was apparent at 2% (v/v) and above, based on concrete.

For the PLA treated samples, compressive strengths were the same or higher than those for the non-air entrained reference even at higher hardened air void content. Strength measurements for the PLA treated samples were significantly higher than those in the air entrained sample even taking into account differences in hardened air contents. At 2% (v/v based on concrete) and above, retardation affects strength gain negatively. This can be counteracted, however, by introduction of an accelerator. Such an accelerator could be encapsulated by the degradable polymeric particle so that it is released in coordination with the degradation of the particle It should be noted that freeze-thaw resistance was not expected to be observed in Examples 6-8, due to the particle size used. However, petrographic examinations of aged PLA treated samples revealed an increase in the amount of air voids present as compared to those measured during the plastic state, showing that the particles degrade over time to generate air voids in the cementitious system.

A smaller size degradable polymeric particle would be more favorable with regard to the spacing factor and specific surface measurements required for freeze thaw durable concrete.

In addition, use of degradable polymer hollow spheres (including filled spheres) could be useful in dosing an appropriate volume to generate a sufficient void structure without overly retarding mix as a result of higher loadings of lactide. Hollow spheres of this type could be filled with an accelerating admixture solution to counterbalance any retardation resulting from degradation. In addition, since the accelerating admixture would not be immediately released into the hydrating cementitious mixture, slump retention performance would not be compromised.

It will be understood that the embodiments described herein are merely exemplary, and that one skilled in the art may make variations and modifications without departing from the spirit and scope of the invention. All such variations and modifications are intended to be included within the scope of the invention as described hereinabove. Further, all embodiments disclosed are not necessarily in the alternative, as various embodiments of the invention may be combined to provide the desired result.

We claim:

1. A cementitious freeze-thaw damage resistant composition comprising hydraulic cement, wherein the hydraulic cement comprises at least one of portland cement, calcium aluminate cement, magnesium phosphate cement, magnesium potassium phosphate cement, or calcium sulfoaluminate cement; and polymeric particles at least partially degradable by the cementitious composition environment, wherein the polymeric particles comprise at least one of polylactone polymer, polylactic acid, polyglycolic acid, or copolymers or mixtures thereof.

2. The cementitious composition of claim 1 wherein the degradable polymeric particles comprise a copolymer that is at least one of polylactic acid-polyglycolic acid, lactide-caprolactone, lactide-ethylene oxide, lactide-cyclic carbonate, lactide derived poly(ester amides), or poly-(L-lactide-co-D-lactide).

3. The cementitious composition of claim 1 wherein the composition has a volume of voids that is about 6 volume percent or less.

4. The cementitious composition of claim 1 wherein the degradable polymeric particles have an average diameter of about 100 μm or less.

5. A method for preparing a freeze-thaw damage resistant cementitious composition comprising forming a mixture of water; hydraulic cement wherein the hydraulic cement comprises at least one of portland cement, calcium aluminate cement, magnesium phosphate cement, magnesium potassium phosphate cement, or calcium sulfoaluminate cement; and, polymeric particles at least partially degradable by the cementitious composition environment, wherein the polymeric particles comprise at least one of polylactone polymer, polylactic acid, polyglycolic acid, or copolymers or mixtures thereof.

6. The method of claim 5 wherein the degradable polymeric particles are added in a range from about 0.01 percent to about 4 percent by weight of dry cement.

7. The method of claim 5, wherein the degradable polymeric particles are added to the mixture in at least one of the following forms:
  a. compact mass;
  b. powder; or
  c. liquid admixture.

8. The method of claim 7, wherein the liquid admixture is a viscosity modifying admixture.

9. The method of claim 5 wherein the degradable polymeric particles comprise a copolymer that is at least one of polylactic acid-polyglycolic acid, lactide-caprolactone, lactide-ethylene oxide, lactide-cyclic carbonate, lactide derived poly(ester amides), or poly(L-lactide-co-D-lactide).

10. A cementitious freeze-thaw damage resistant composition comprising hydraulic cement, wherein the hydraulic cement comprises at least one of portland cement, calcium aluminate cement, magnesium phosphate cement, magnesium potassium phosphate cement, or calcium sulfoaluminate cement; and polymeric particles at least partially degradable by the cementitious composition environment, wherein void spaces are created as at least a portion of the polymeric particles degrade over a period of during hydration, during set, or up to about a month after set of the cementitious composition.

11. The cementitious composition of claim 10 wherein the composition has a volume of voids that is about 6 volume percent or less.

12. The cementitious composition of claim 10 wherein the degradable polymeric particles comprise a polymer that is at least one of polyester polymer, polylactone polymer, polylactic acid, polyglycolic acid, or copolymers, or mixtures thereof.

13. The cementitious composition of claim 12 wherein the degradable polymeric particles comprise a copolymer that is at least one of polylactic acid-polyglycolic acid, lactide-caprolactone, lactide-ethylene oxide, lactide-cyclic carbonate, lactide derived poly(ester amides), or poly(L-lactide-co-D-lactide).

14. The cementitious composition of claim 10 wherein the degradable polymeric particles have an average diameter of about 100 µm or less.

15. A method for preparing a freeze-thaw damage resistant cementitious composition comprising forming a mixture of water, hydraulic cement, wherein the hydraulic cement comprises at least one of portland cement, calcium aluminate cement, magnesium phosphate cement, magnesium potassium phosphate cement, or calcium sulfoaluminate cement; and, polymeric particles at least partially degradable by the cementitious composition environment, wherein void spaces are created when at least of portion of the polymeric particles degrade over a period of during hydration, during set, or up to about a month after set of the cementitious composition.

16. The method of claim 15 wherein the degradable polymeric particles are added in a range from about 0.01 percent to about 4 percent by weight of dry cement.

17. The method of claim 15, wherein the degradable polymeric particles are added to the mixture in at least one of the following forms:
  a. compact mass;
  b. powder; or
  c. liquid admixture.

18. The method of claim 17, wherein the liquid admixture is a viscosity modifying admixture.

19. The method of claim 15 wherein the degradable polymeric particles degrade during set.

20. The method of claim 19, wherein the degradable polymeric particles comprise hollow microspheres, optionally wherein the hollow microspheres contain an accelerating admixture solution.

21. The method of claim 15 wherein the degradable polymeric particles comprise a polymer that is at least one of polyester polymer, polylactone polymer, polylactic acid, polyglycolic acid or copolymers, or mixtures thereof.

22. The method of claim 21 wherein the degradable polymeric particles comprise a copolymer that is at least one of polylactic acid-polyglycolic acid, lactide-caprolactone, lactide-ethylene oxide, lactide-cyclic carbonate, lactide derived poly(ester amides), or poly(L-lactide-co-D-lactide).

* * * * *